US012199502B2

(12) United States Patent
Smith et al.

(10) Patent No.: US 12,199,502 B2
(45) Date of Patent: Jan. 14, 2025

(54) START SEQUENCE METHOD AND APPARATUS FOR THREE-PHASE TRANSFORMERS

(71) Applicant: L3Harris Technologies, Inc., Melbourne, FL (US)

(72) Inventors: Alexander N. Smith, Trabuco Canyon, CA (US); Lixin Tang, Irvine, CA (US); Uzzal Islam, Anaheim, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 118 days.

(21) Appl. No.: 18/311,478

(22) Filed: May 3, 2023

(65) Prior Publication Data

US 2024/0372463 A1  Nov. 7, 2024

(51) Int. Cl.
*H02M 1/36* (2007.01)
*H02M 1/00* (2006.01)
*H02M 1/08* (2006.01)

(52) U.S. Cl.
CPC ........... *H02M 1/36* (2013.01); *H02M 1/0058* (2021.05); *H02M 1/083* (2013.01)

(58) Field of Classification Search
CPC ....... H02M 1/36; H02M 1/0058; H02M 1/083
USPC ....................................................... 315/307
See application file for complete search history.

(56) References Cited

U.S. PATENT DOCUMENTS

| 3,636,355 | A | * | 1/1972 | James | H05G 1/18 |
|---|---|---|---|---|---|
| | | | | | 323/911 |
| 4,924,342 | A | * | 5/1990 | Lee | H02H 9/02 |
| | | | | | 361/42 |
| 6,493,203 | B1 | * | 12/2002 | Ito | H01H 9/563 |
| | | | | | 361/76 |
| 8,564,159 | B2 | * | 10/2013 | Udagawa | H02H 9/002 |
| | | | | | 307/125 |
| 9,170,597 | B2 | * | 10/2015 | Kamei | H02H 7/04 |
| 9,385,525 | B2 | * | 7/2016 | Koshizuka | H02H 9/002 |
| 2004/0124814 | A1 | * | 7/2004 | Tsutada | G05F 1/12 |
| | | | | | 323/247 |
| 2010/0039737 | A1 | * | 2/2010 | Koshizuka | H02H 9/002 |
| | | | | | 361/36 |

(Continued)

FOREIGN PATENT DOCUMENTS

| EP | 2736147 B1 | 5/2014 |
|---|---|---|
| JP | 5092073 B1 | 12/2012 |
| JP | 5208593 B2 | 6/2013 |

*Primary Examiner* — Ryan Jager

(74) *Attorney, Agent, or Firm* — Edell, Shapiro & Finnan, LLC

(57) ABSTRACT

A method of applying three-phase power to a transformer having limbs including a first limb, a second limb, and a third limb respectively wound with primary windings that include a first winding, a second winding, and a third winding, includes: generating alternating current (AC) voltages (AC voltages) including a first AC voltage, a second AC voltage, and a third AC voltage; initially not applying the AC voltages to the primary windings; monitoring a relative voltage between the first AC voltage and the second AC voltage; and based on results of monitoring, implementing a power-on sequence of sequentially applying various ones of the AC voltages to corresponding ones of the primary windings until all of the AC voltages are applied to all of the primary windings in a manner that balances flux across the limbs during and after the power-on sequence.

20 Claims, 12 Drawing Sheets

(56) References Cited

U.S. PATENT DOCUMENTS

| | | | |
|---|---|---|---|
| 2010/0141235 A1* | 6/2010 | Koshiduka | H02H 9/002 |
| | | | 323/908 |
| 2011/0181989 A1* | 7/2011 | Udagawa | H02H 9/002 |
| | | | 361/35 |
| 2011/0204870 A1* | 8/2011 | Tsutada | H01H 33/593 |
| | | | 323/355 |
| 2012/0236443 A1* | 9/2012 | Kinoshita | H01H 9/563 |
| | | | 361/36 |
| 2012/0280577 A1* | 11/2012 | Garza Milling | H02J 3/36 |
| | | | 307/146 |

* cited by examiner

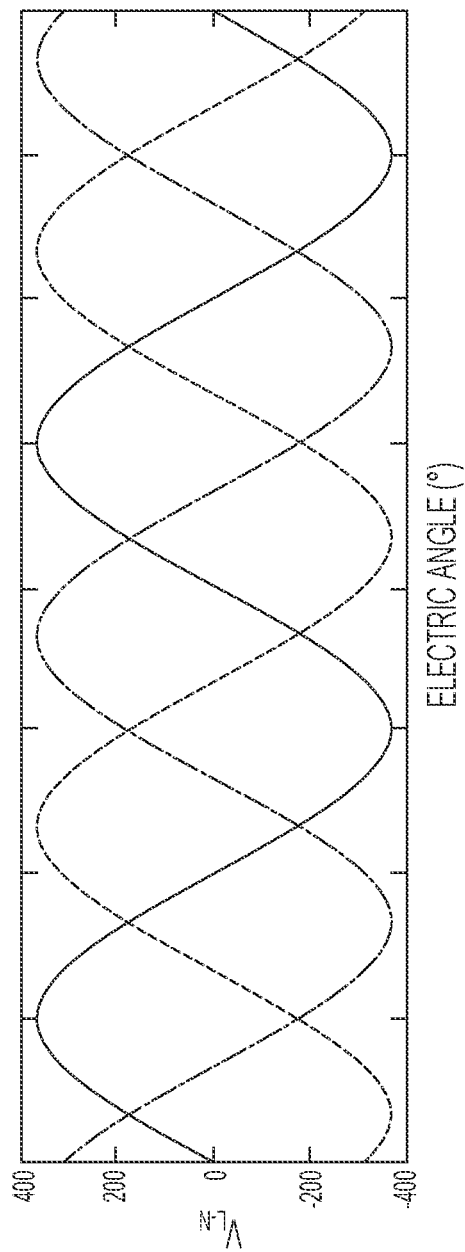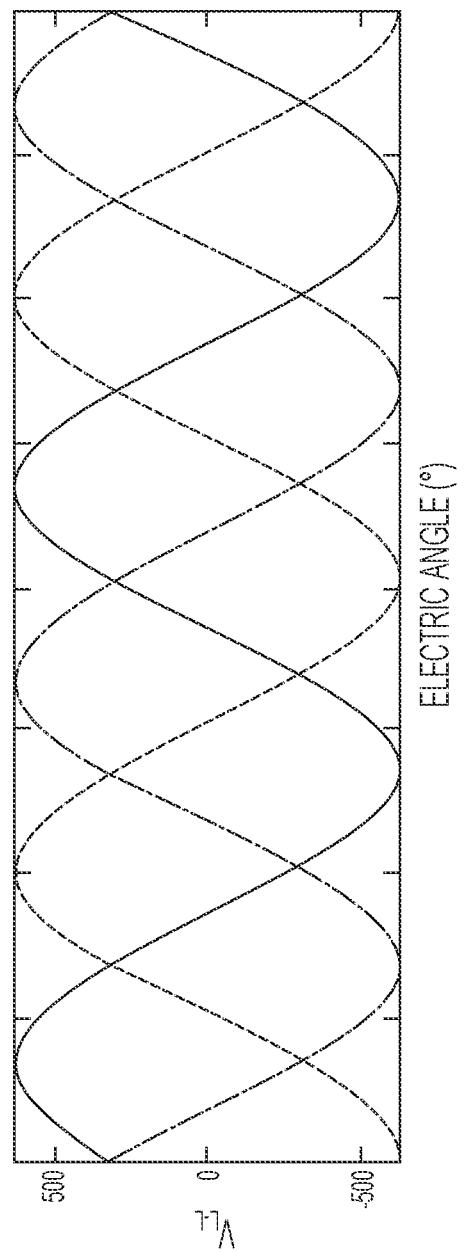

START SEQUENCE METHOD AND APPARATUS FOR THREE-PHASE TRANSFORMERS

TECHNICAL FIELD

The present disclosure relates generally to powering-on transformers.

BACKGROUND

An alternating current (AC) three-phase transformer with a three-limb structure may be used for different three-phase power applications. During power-on or start-up of the transformer (sometimes referred to as "Black start"), transformer power-on transients can attain volt*second magnitudes that exceed twice a rated value, generating "plug-in" magnetic saturation and large inrush currents. The large inrush currents can rise beyond 1,000 Amps (A), which can potentially trip a circuit breaker preceding the transformer and thereby disrupt critical load energization. To accommodate such conditions, the transformer may be "over-designed" to handle a doubled maximum volt*second to mitigate the inrush current. Such over-design disadvantageously increases weight, volume, and cost of the transformer.

BRIEF DESCRIPTION OF THE DRAWINGS

FIG. 8A shows plots of example line-to-neutral voltages that result from 3Φ voltages.

FIG. 8B shows plots of example line-to-line voltages that result from 3Φ voltages.

DESCRIPTION

Overview

In an embodiment, a method of applying three-phase power to a transformer having limbs including a first limb, a second limb, and a third limb respectively wound with primary windings that include a first winding, a second winding, and a third winding, includes: generating alternating current (AC) voltages (AC voltages) including a first AC voltage, a second AC voltage, and a third AC voltage; initially not applying the AC voltages to the primary windings; monitoring a relative voltage between the first AC voltage and the second AC voltage; and based on results of monitoring, implementing a power-on sequence of sequentially applying various ones of the AC voltages to corresponding ones of the primary windings until all of the AC voltages are applied to all of the primary windings in a manner that balances flux across the limbs during and after the power-on sequence.

Example Embodiments

Embodiments presented herein are directed to an optimal voltage power-on or turn-on sequence for a 3Φ transformer, such as a three-limb, delta-connected, three phase (3Φ) transformer. The embodiments reduce power-on (i.e., "plug-in") inrush currents to the transformer, enabling a load connected to the transformer to enter a current steady-state much faster than is possible with a conventional power-on technique. The embodiments substantially remove an electrical/thermal stress on the transformer that is related to the plug-in inrush current, which improves the life expectancy of the transformer. In addition, power systems that employ the embodiments are likely to experience less potential circuit breaker disruptions due to the plug-in inrush currents.

Figure 1:
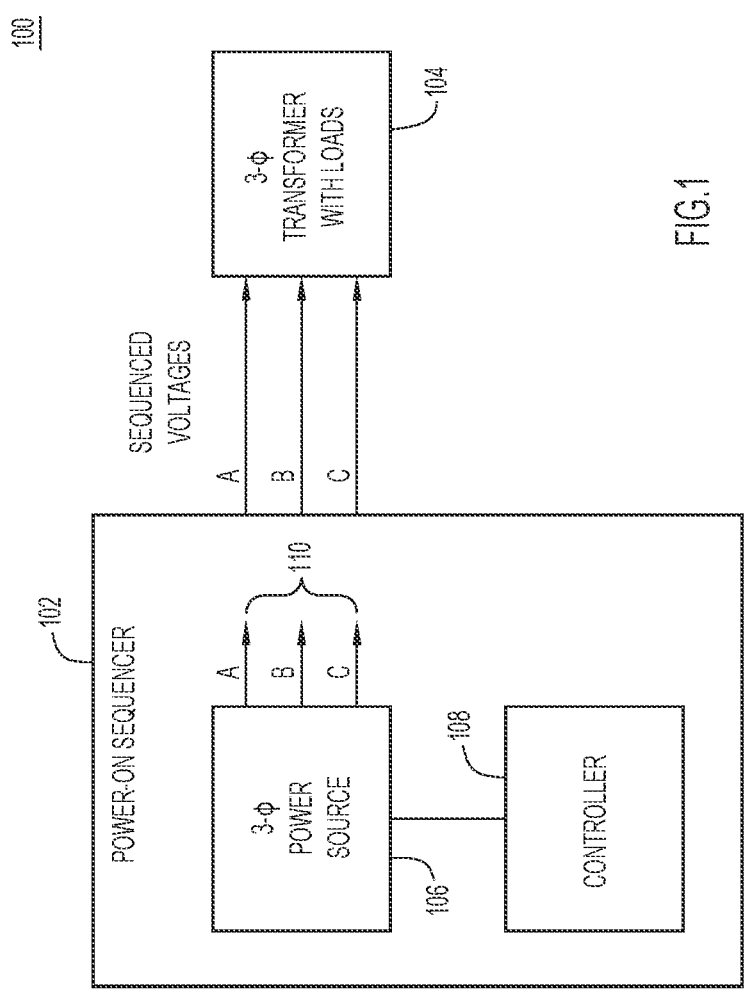
FIG. 1 is a high-level block diagram of an example power system in which an optimal power-on sequence for a transformer may be implemented.

FIG. 1 is a high-level block diagram of an example power system 100 (also referred to as an "apparatus") in which the optimal power-on sequence for a transformer may be implemented. Power system 100 includes a power-on sequencer 102 coupled to a 3Φ transformer and load 104. Power-on sequencer 102 includes a 3Φ power source 106 coupled to a controller 108. Power-on sequencer 102 optionally includes a static power switch (not shown), depending on the embodiment. 3Φ power source 106 generates 3Φ AC voltages 110 including a first AC voltage A, a second AC voltage B, and a third AC voltage C (referred to simply as "voltage A," "voltage B." and "voltage C"), which are equal in amplitude but offset or separated in phase with respect to each other by 120°. Power-on sequencer 102 powers-on/energizes transformer and load 104 from a cold start (when no power is applied to the transformer and load) under control of controller 108. More specifically, power-on sequencer 102 selectively applies or switches particular ones of voltages A, B, and C to transformer and load 104 in a predetermined sequence to balance flux in the transformer and load during the power-on, in order to avoid excessive inrush current. The 3Φ AC voltages applied by power-on sequencer 102 to transformer and load 104 may be referred to as sequenced voltages.

Details of an example 3Φ transformer included in transformer and load 104 are described below in connection with FIG. 2-5B.

Figure 2:
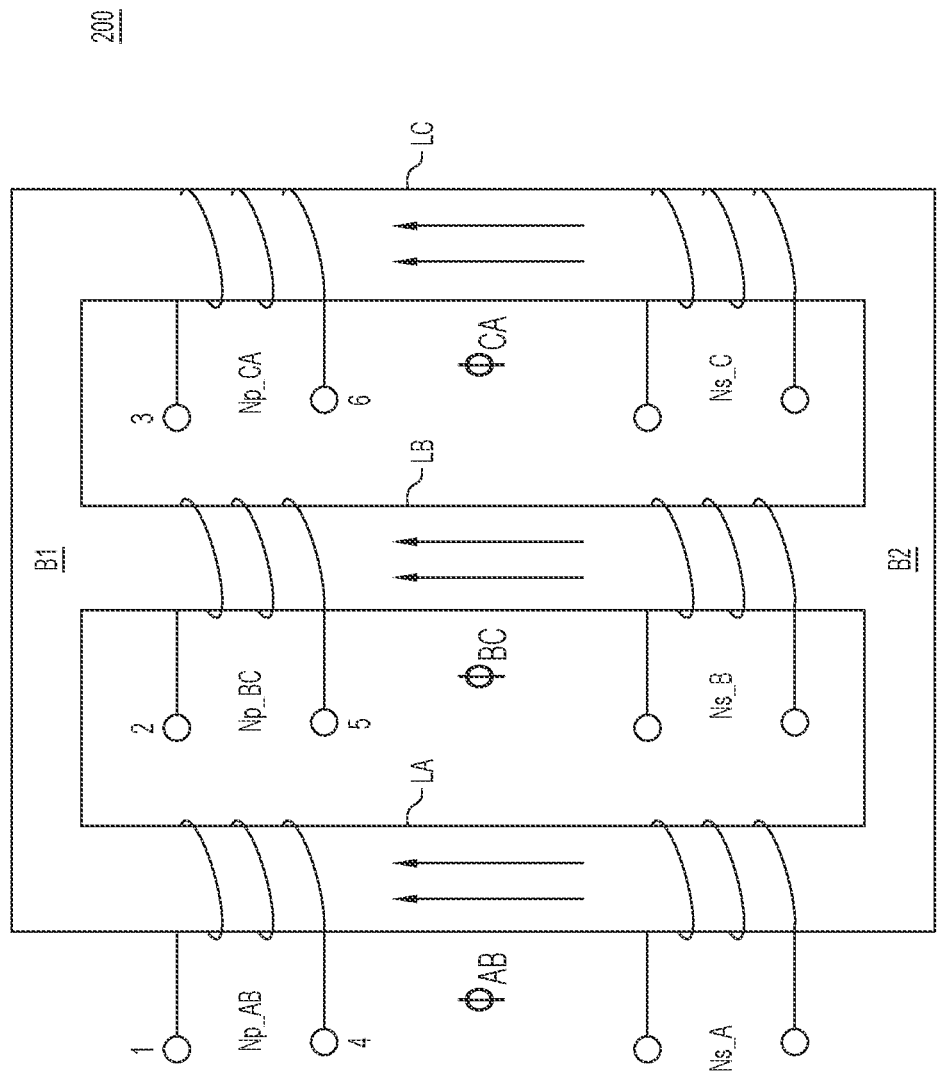
FIG. 2 is an illustration of an example three-phase (3Φ) three-limb transformer employed by the power system.

FIG. 2 is an illustration of an example 3Φ 3-limb transformer 200 according to an embodiment. Transformer 200 may be included in transformer and load 104. Transformer 200 includes 3 limbs or legs LA, LB, and LC. Limbs LA, LB, and LC are spaced-apart from each other in a horizontal direction and each extend in a vertical direction so as to be parallel to each other. Transformer 200 includes a top bar B1 and a bottom bar B2 that each extend in the horizontal direction and are connected to respective tops and respective bottoms of limbs LA, LB, and LC, as shown. Limbs LA, LB, and LC, top bar B1, and bottom bar B2 together form a contiguous laminate structure.

Transformer 200 includes 3 primary-side windings (also referred to simply as "primary windings") including windings Np_AB (with terminals 1, 4), Np_BC (with terminals 2, 5), and Np_CA (with terminals 3, 6), wound on limbs LA, LB, and LC, respectively. Transformer 200 also include 3 secondary-side windings (also referred to simply as "secondary windings") Ns_A, Ns_B, and Ns_C wound on limbs LA, LB, and LC, respectively. Each secondary winding includes a respective pair of terminals.

Figure 3:
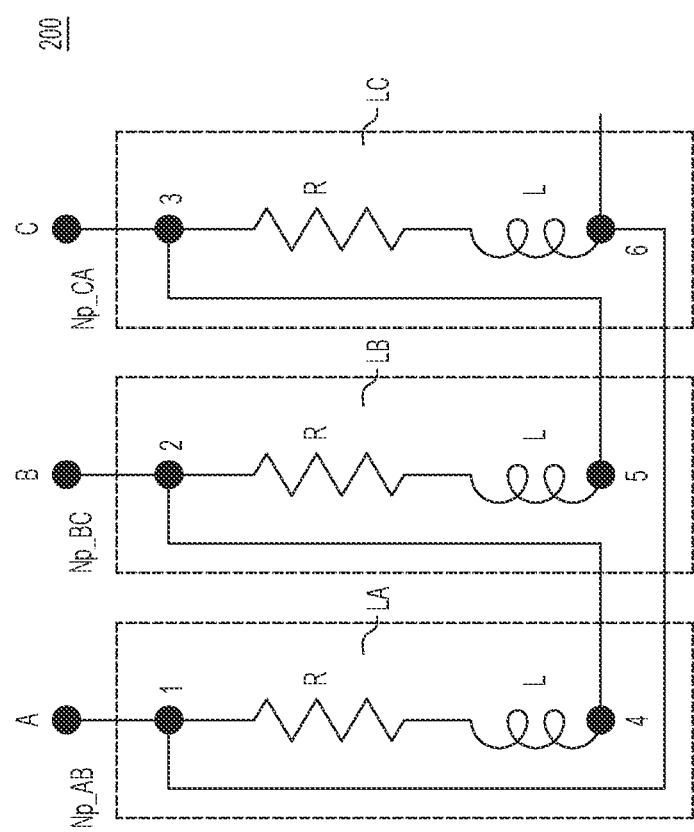
FIG. 3 is an illustration of three primary-side windings of the transformer connected in a delta-connection configuration according to an embodiment.

FIG. 3 is an illustration that shows the three primary-side windings of transformer 200 connected in a delta-connection configuration. Each primary-side winding is respectively modeled as a resistor R connected in series with an inductance L. The three primary-side windings of transformer 200 are connected in a loop fashion, which is referred to as the "delta-connection." As shown in FIG. 3, terminal 4 of primary-side winding Np_AB connects to terminal 2 of primary-side winding Np_BC, terminal 5 of primary-side winding Np_BC connects to terminal 3 of primary-side winding Np_CA, and terminal 6 of primary-side winding Np_CA connects to terminal 1 of primary-side winding Np_AB.

Figure 4:
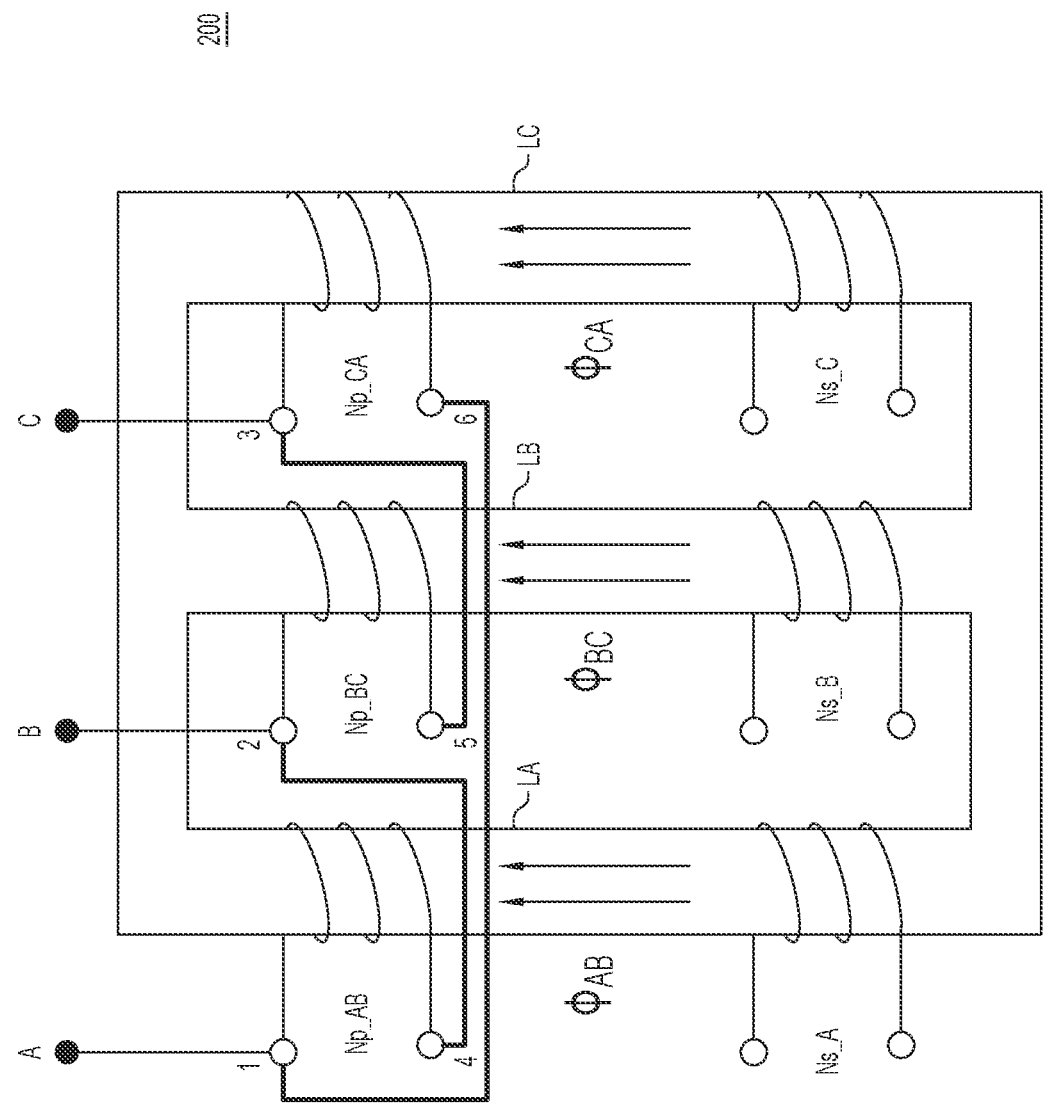
FIG. 4 shows the transformer with 3Φ voltages in a balanced configuration applied to input terminals of the primary-side windings according to an embodiment.

FIG. 4 shows transformer 200 with voltages A, B, and C in a balanced configuration applied to terminals 1, 2, and 3 of primary-side windings Np_AB, Np_BC, and Np_CA, respectively. The secondary-side windings may be either delta-connected or star-connected. FIG. 4 also shows magnitudes (represented as arrows) of fluxes $\Phi_{AB}$, $\Phi_{BC}$, and $\Phi_{CA}$ in limbs LA, LB, and LC. The magnitudes of fluxes $\Phi_{AB}$, $\Phi_{BC}$, and $\Phi_{CA}$ are equal or balanced across limbs LA, LB, and LC as a result of the balance voltages.

Figure 5A:
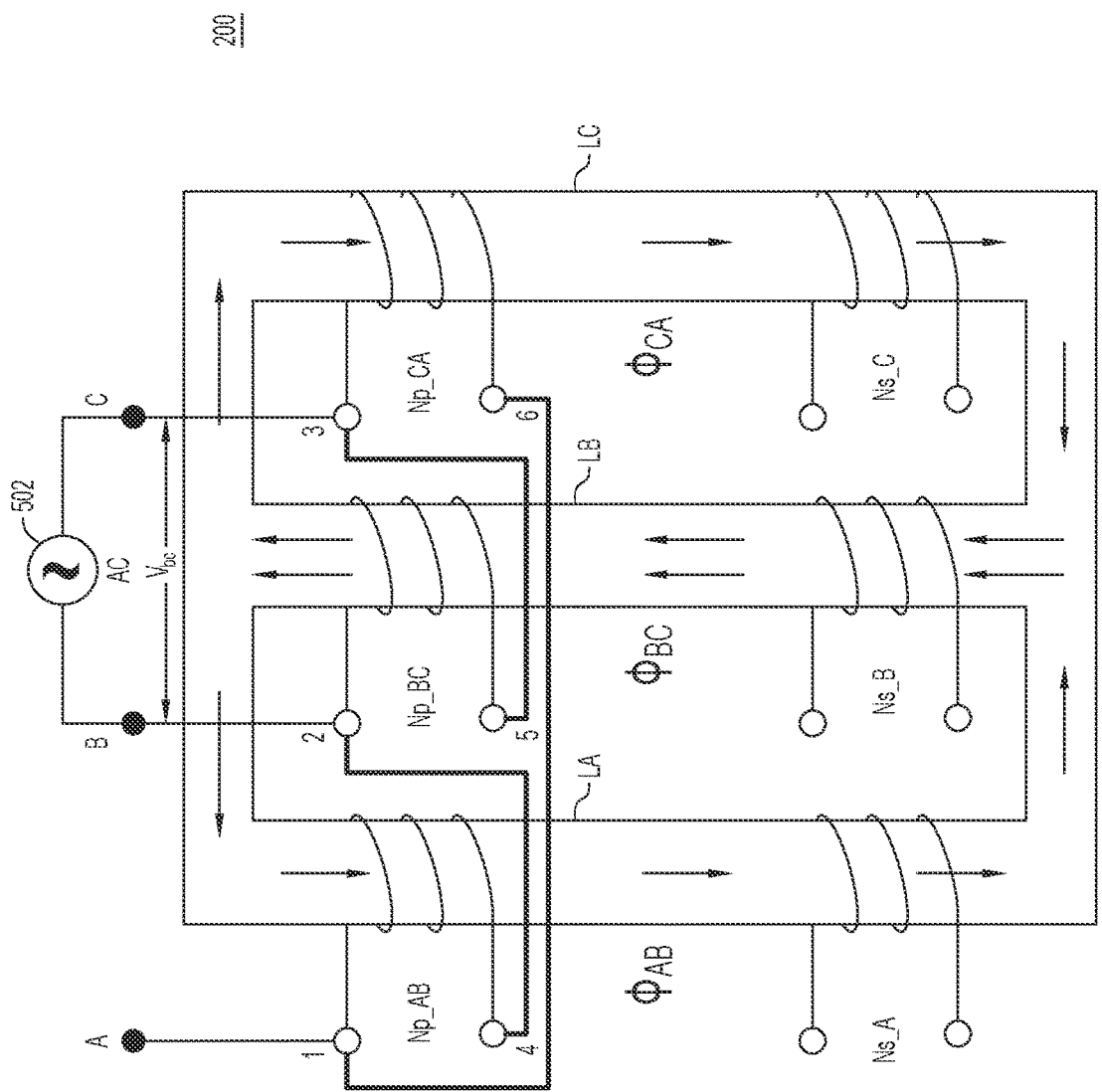
FIG. 5A shows flux paths in the transformer when two phases are energized concurrently by an AC voltage according to an embodiment.

FIG. 5A shows flux paths in transformer 200 when primary-side windings Np_BC and Np_CA are energized concurrently by an AC voltage generated by an AC power source 502. As shown, all 3 limbs LA, LB, and LC of transformer 200 have flux linkages even with the single excitation source. In the example of FIG. 5A, line-to-line voltage Vbc is applied to transformer 200, i.e., across terminals 2 and 3, which generates unbalanced fluxes $\Phi_{AB}$, $\Phi_{BC}$, and $\Phi_{CA}$. It is noted that flux $\Phi_{AB}=\Phi_{CA}$ in a symmetrical 3 limb transformer.

Figure 5B:
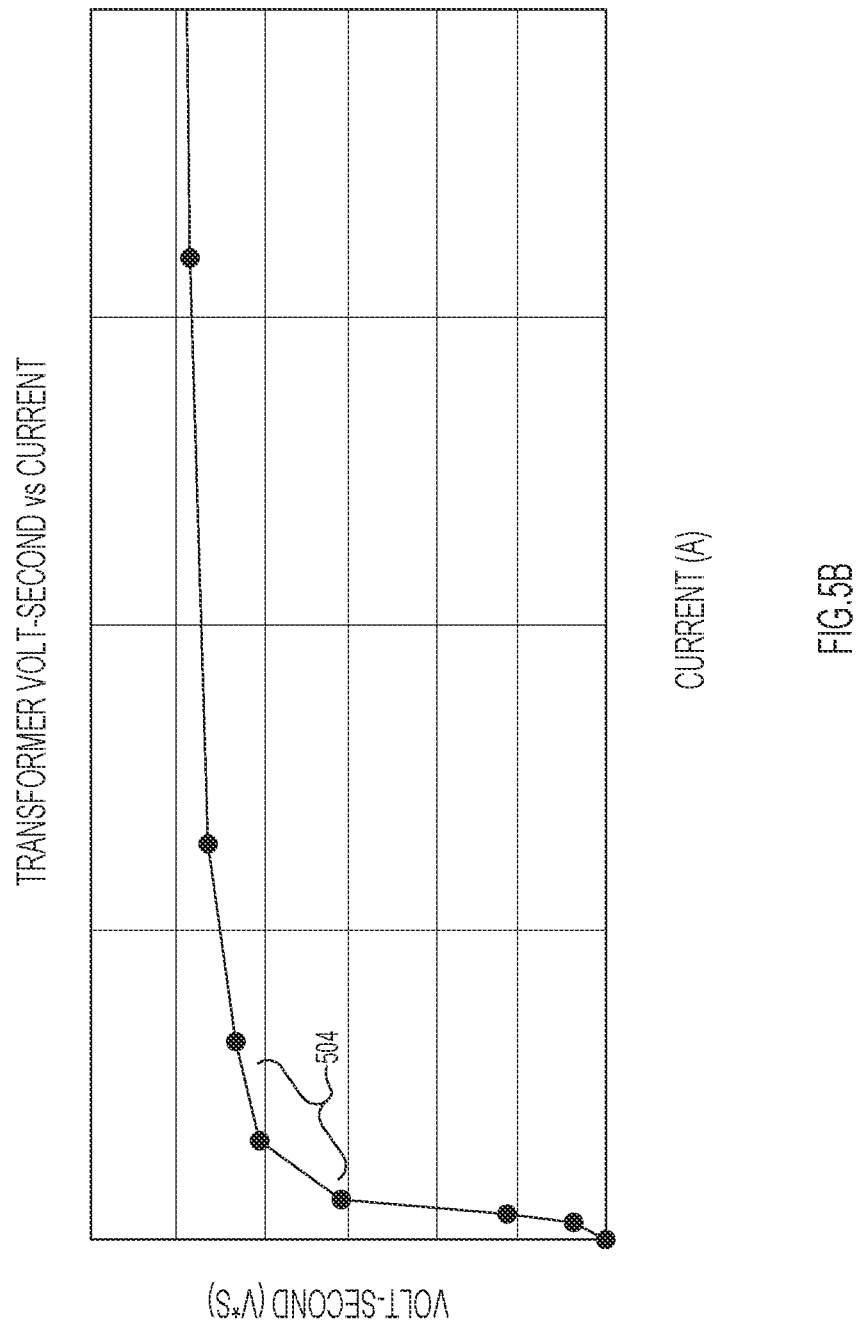
FIG. 5B shows an example excitation characteristic for the transformer in the form of a plot of transformer volt*second (v*s).

FIG. 5B shows a typical excitation characteristic for transformer 200 in the form of a plot of transformer volt-second vs. current. Normally, an operating volt*second should be around "knee" area 504, just before saturation starts.

Details of power-on sequencer 102 according to multiple embodiments are described below in connection with FIGS. 6 and 7.

Figure 6:
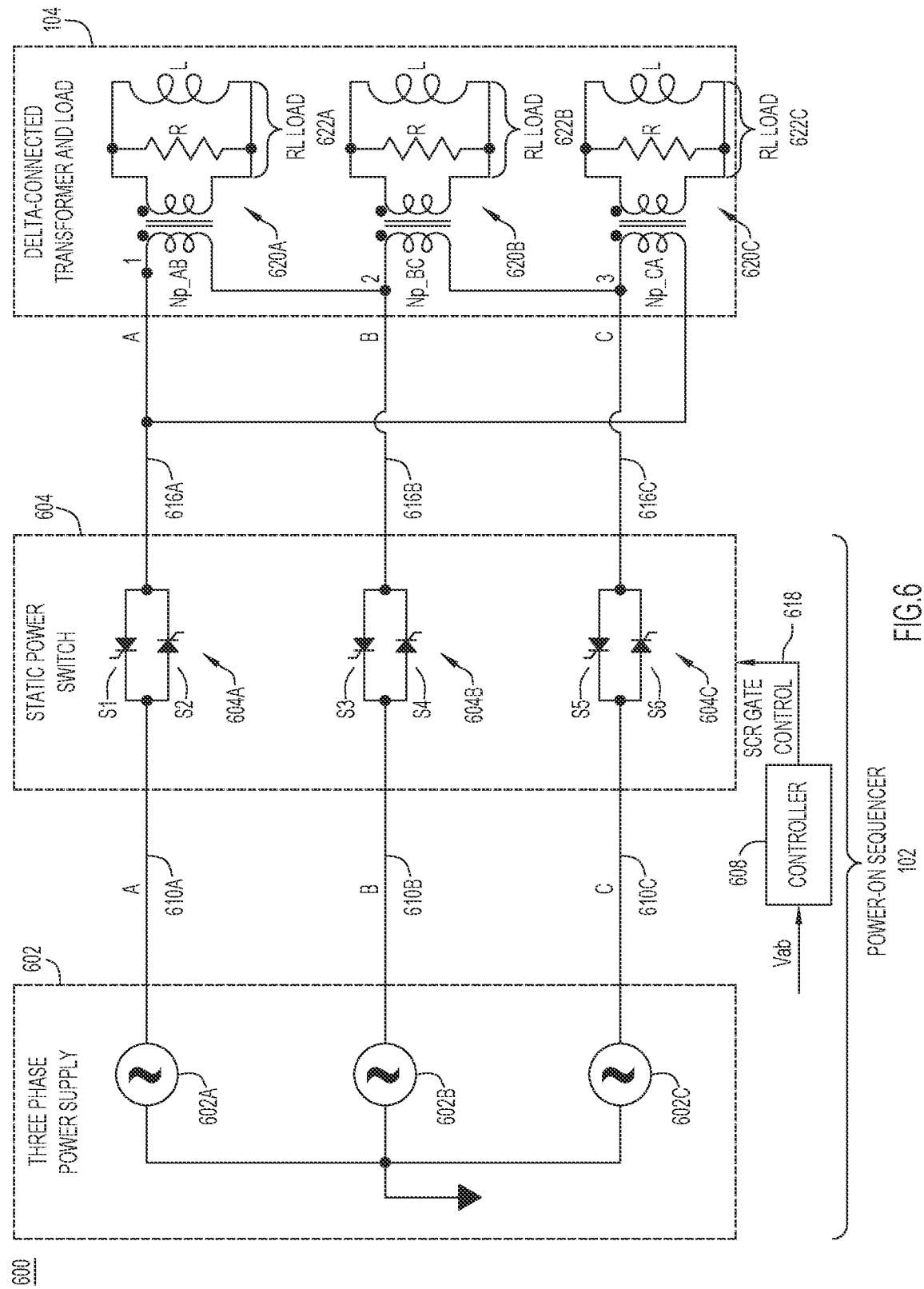
FIG. 6 is a detailed block diagram of the power system according to an embodiment.

FIG. 6 is a block diagram of an example power system 600, which represents power system 100 according to an embodiment. In the example of FIG. 6, power-on sequencer 102 includes a 3Φ power source 602 (representative of 3Φ power source 106 in FIG. 1), a static power switch 604, and a controller 608 (representative of controller 108 in FIG. 1) coupled to each other. Static power switch 604 is also coupled to transformer and load 104. 3Φ power source 602 includes power sources 602A, 602B, and 602C to generate voltages A, B, and C and to provide the same to static power switch 604 over lines 610A, 610B, and 610C coupled to the 3Φ power source and the static power switch.

Static power switch 604 includes 3 parallel switches 604A including sub-switch pair (S1, S2), 604B including sub-switch pair (S3, S4), and 604C including sub-switch pair (S5, S6) having inputs respectively connected to lines 610A, 610B, and 610C and outputs respectively connected to lines 616A, 616B, and 616C, which are connected to transformer and load 104. Each sub-switch pair includes two silicon controlled rectifiers (SCRs) (also referred to as thyristors) connected to each other in oppositely biased directions, between input and output lines, as shown. FIG. 6 shows a particular configuration for each switch 604i by way of example, only. It is understood that any known or hereafter developed AC power switch may be used for each switch 604i provided that it is configured to selectively block AC power under control of controller 608. Moreover, in an embodiment, one of switches 604A, 604B, and 604C (e.g., switch 604C) may be omitted, leaving only two remaining switches. In another embodiment, static power switch 604 may take the form of an AC/AC matrix converter.

Responsive to (i.e., under control of) switch control signals 618 (also referred to as an "SCR gate control") generated by controller 608, switches 604A, 604B, and 604C individually selectively connect/disconnect lines 610A, 610B, and 610C to/from lines 616A, 616B, and 616C and thereby selectively pass/block voltages A, B, and C supplied by power sources 602A, 602B, and 602C to/from transformer and load 104, respectively. Controller 608 receives a line-to-line voltage Vab and generates switch control signal 618 based on the line-to-line voltage Vab and other parameters/conditions described below. Switch control signals 618 may include multiple signals, including one per of signals for each pair of sub-switches.

Transformer and load 104 includes transformer 200 with transformer-load sections 620A, 620B, and 620C configured to include limbs LA, LB, and LC. Transformer-load section 620A includes primary-side winding Np_AB connected to line 616A, secondary-side winding Ns_A, and a resistive and inductive load (RL) 622A coupled to the secondary-side winding. Transformer-load section 620B includes primary-side winding Np_BC connected to line 616B, secondary-side winding Ns_B, and an RL load 622B coupled to the secondary-side winding. Transformer-load section 620C includes primary-side winding Np_CA connected to line 616C, secondary-side winding Ns_C, and an RL load 622C coupled to the secondary-side winding. In the above-described arrangement, switches 604A, 604B, and 604C individually selectively apply/block voltages A, B, and C generated by power source 602 to/from transformer-load sections 620A, 620B, and 620C under control of switch control signal 618 generated by controller 608.

Figure 7:
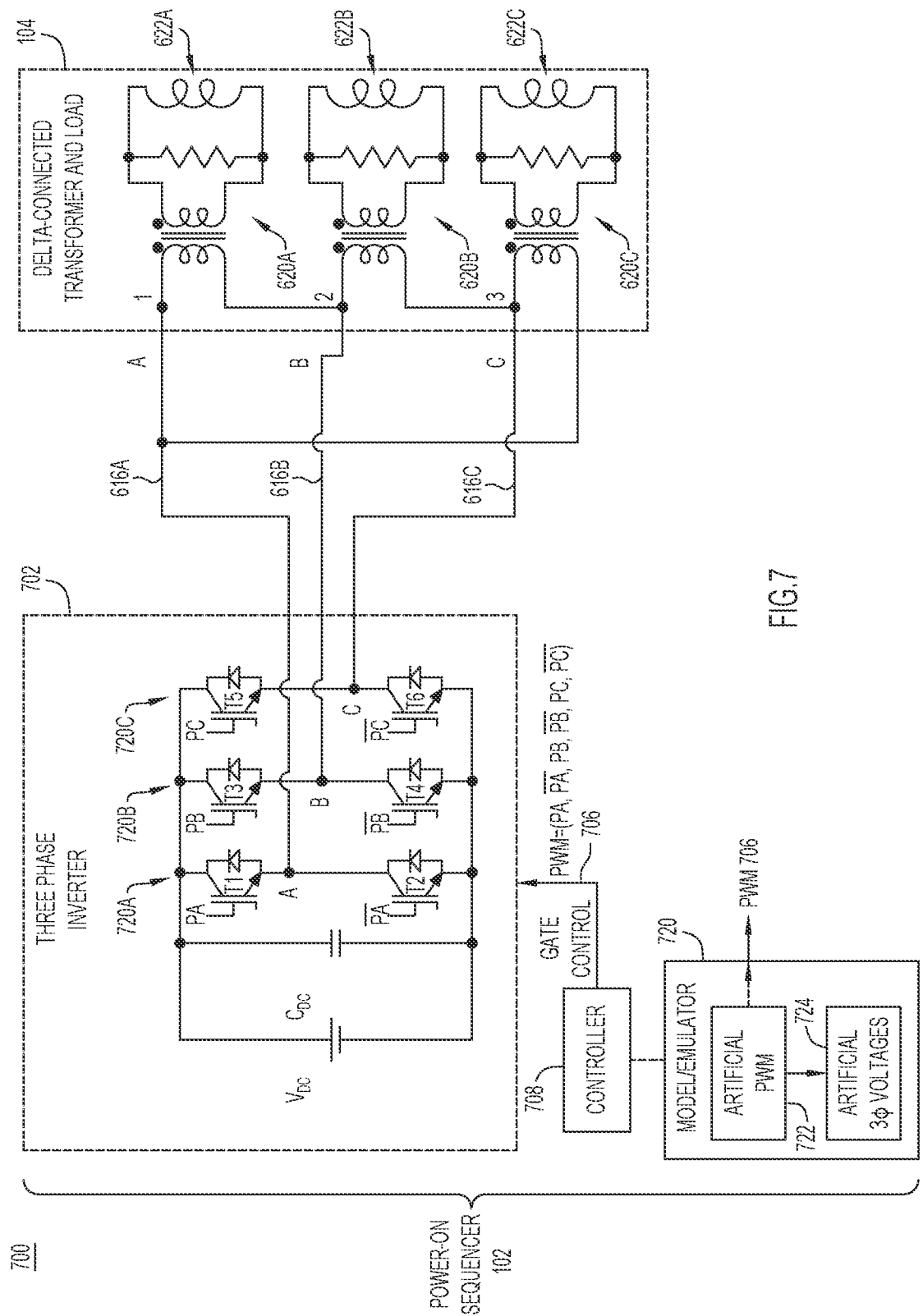
FIG. 7 is a detailed block diagram of the power system according to another embodiment.

FIG. 7 is a block diagram of an example power system 700, which represents power system 100 according to another embodiment. In the example of FIG. 7, power-on sequencer 102 includes a 3Φ inverter 702 to generate 3Φ voltages A. B, and C from a direct current (DC) input voltage $V_{DC}$ (held by a capacitor $C_{DC}$) responsive to PWM signals 706 generated by a controller 708 (representative of controller 108 in FIG. 1), and to apply the 3Φ voltages to transformer and load 104. 3Φ inverter includes inverter legs 720A, 720B, and 720C to generate 3Φ voltages A, B, and C responsive to PWM signals 706. Specifically, inverter legs 720A, 720B, and 720C include series-connected complementary insulated-gate bipolar transistor (IGBT) switches (T1, T2), (T3, T4), and (T5, T6) having gates driven by complementary PWM signal pairs (PA, $\overline{PA}$), (PB, $\overline{PB}$), and (PC, $\overline{PC}$) of PWM signals 706 to generate voltages A, B, and C, respectively. Other types of switches may also be used in place of the IGBTs. It is understood that 3Φ inverter 702 is shown as a two-level voltage source inverter (VSI) by way of example, only; other types of inverters may be used, such as multi-level inverters and current source inverters.

Controller 708 implements a model or emulator 720 having a first module 722 and a second module 724. First module 722 models a PWM generator that generates artificial or virtual PWM signals and applies the same to second module 724. Second module 724 models 3Φ inverter 702 to generate artificial or virtual versions A', B' and C' of the 3Φ voltages A, B, and C responsive to the artificial PWM signals. Module 724 further generates an artificial version Vab' of relative voltage Vab. The artificial versions A', B' and C' (and Vab') model corresponding 3Φ voltages A, B, and C (and Vab). The artificial voltages and PWM signals remain internal to controller 708; however, the artificial PWM signals may be selectively provided to 3Φ inverter 702 as "actual" PWM signals 706 to generate "actual" 3Φ voltages A, B, and C under certain conditions, as described below. The "artificial versions of voltages" A, B, C, and Vab may also be referred to more simply as "artificial voltages."

FIG. 8A shows plots of three line-to-neutral voltages ($V_{L-N}$) Van, Vbn, and Von that result from 3Φ voltages A, B, and C. Voltage Van leads voltage Vbn by 120°, and voltage Vbn leads voltage Von by 120°.

FIG. 8B shows plots of example line-to-line voltages ($V_{L-L}$) Vab, Vbc, and Vca that result from 3Φ voltages A, B, and C. Voltage Vab leads voltage Vbc by 120°, and voltage Vbc leads voltage Vca by 120°. The line-to-line voltages lead their corresponding line-to-neutral voltages by 30°.

Various waveforms useful for describing the power-on sequence according to embodiments presented herein are described below in connection with FIGS. 9-12.

Figures 9, 10, 11, 12:
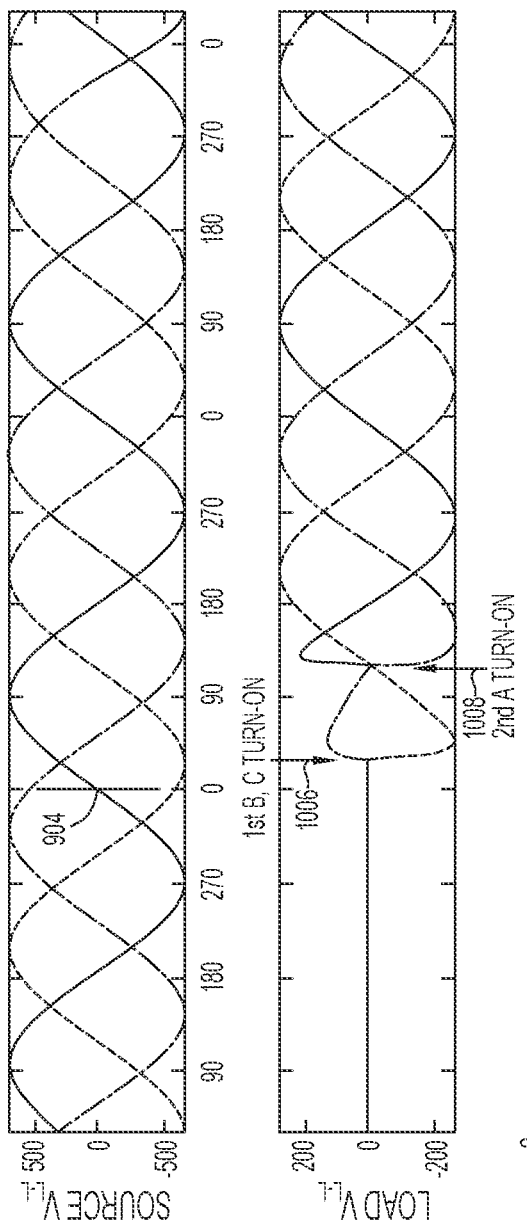
FIG. 9 shows plots of example "source" line-to-line voltages generated by a power source.
FIG. 10 shows plots of example "load" line-to-line voltages that are applied to a transformer and load during a turn-on sequence for the 3Φ voltages.
FIG. 11 shows plots of example flux linkage of the primary-side windings of the transformer and load resulting from the applied 3Φ voltages from FIG. 10.
FIG. 12 shows plots of example 3Φ currents IA, IB, and IC corresponding to the applied 3Φ voltages.

FIG. 9 (similar to FIG. 8B) shows plots of example source line-to-line voltages Vab, Vbc, and Vca generated by the above-described power supplies (including artificial voltages generated by emulator 720 of controller 708), but that are not necessarily applied to transformer and load 104, except under certain conditions described below in connection with FIG. 10. Voltage Vab may be used as a reference waveform to determine when to turn-on and apply voltages A, B, and C to transformer and load 104. For example, FIG. 9 shows a negative-to-positive zero-crossing 904 of voltage Vab that occurs at some initial time and at an initial phase of voltage Vab (e.g., a phase of 0°). Zero-crossing 904 serves as a trigger for the power-on sequence for voltages A, B, and C to transformer and load 104.

FIG. 10 shows plots of example load line-to-line voltages Vab, Vbc, and Vca (which are identified with the same labels as their corresponding source line-to-line voltages) that are actually applied to transformer and load 104 during the power-on sequence for voltages A, B, and C. During an initial time period spanning 360°, load line-to-line voltages Vab, Vbc, and Vca are all zero because voltages A, B, and C are turned-off with respect to transformer and load 104 and thus are not applied to the transformer and load.

Zero-crossing 904 (shown in FIG. 9) triggers and is followed by two main (sequential) turn-on points (shown in FIG. 10) including a first turn-on point 1006 followed by a second turn-on point 1008. First turn-on point 1006 occurs when the phase of voltage Vab has rotated 30° past the initial phase at the zero-crossing 904 (i.e., when the phase of voltage Vab has rotated 30° further). At first turn-on point 1006, voltage B and C are turned-on, but voltage A remains turned off. Thus, voltages B, C are concurrently applied to and thus energize transformer sections 620B, 620C, respectively, while transformer section 620A remains deenergized. Subsequently, second turn-on point 1008 occurs when the phase of voltage Vab has rotated a further 120° after zero-crossing 904 (or, equivalently, 90° after first turn-on point 1006). At second turn-on point 1008, while voltages B and C remain turned-on, voltage A is also turned-on. Thus, voltages A, B, and C respectively energize transformer sections 622A, 622B, and 622C. Voltages A, B, and C remain turned-on and the turn-on sequence is complete.

For the above power-on sequence (also referred to as a "turn-on sequence" because the sequence turns-on the voltages), the first turn-on point should occur at/coincide with a peak of a source line-to-line voltage to ensure that the volt*second corresponding to the voltage Vab has a zero DC offset. Within any 360° there are 6 points that can be selected as the first turn-on point. The second turn-on point should occur 90° or 270° after the first turn-on point. Together, the successive turn-on points mitigate inrush currents into transformer and load 104.

FIG. 11 shows plots of example flux linkage (in volt*seconds) of the three primary-side windings of transformer and load 104.

FIG. 12 shows plots of example 3Φ currents $I_A$, $I_B$, and $I_C$ flowing in the three-primary side windings corresponding to voltages A, B, and C.

As shown in the above-described figures, the flux and currents in transformer and load 104 are balanced almost immediately after second turn-on point 1008, e.g., within 90° of completing the power-on sequence.

Figure 13:
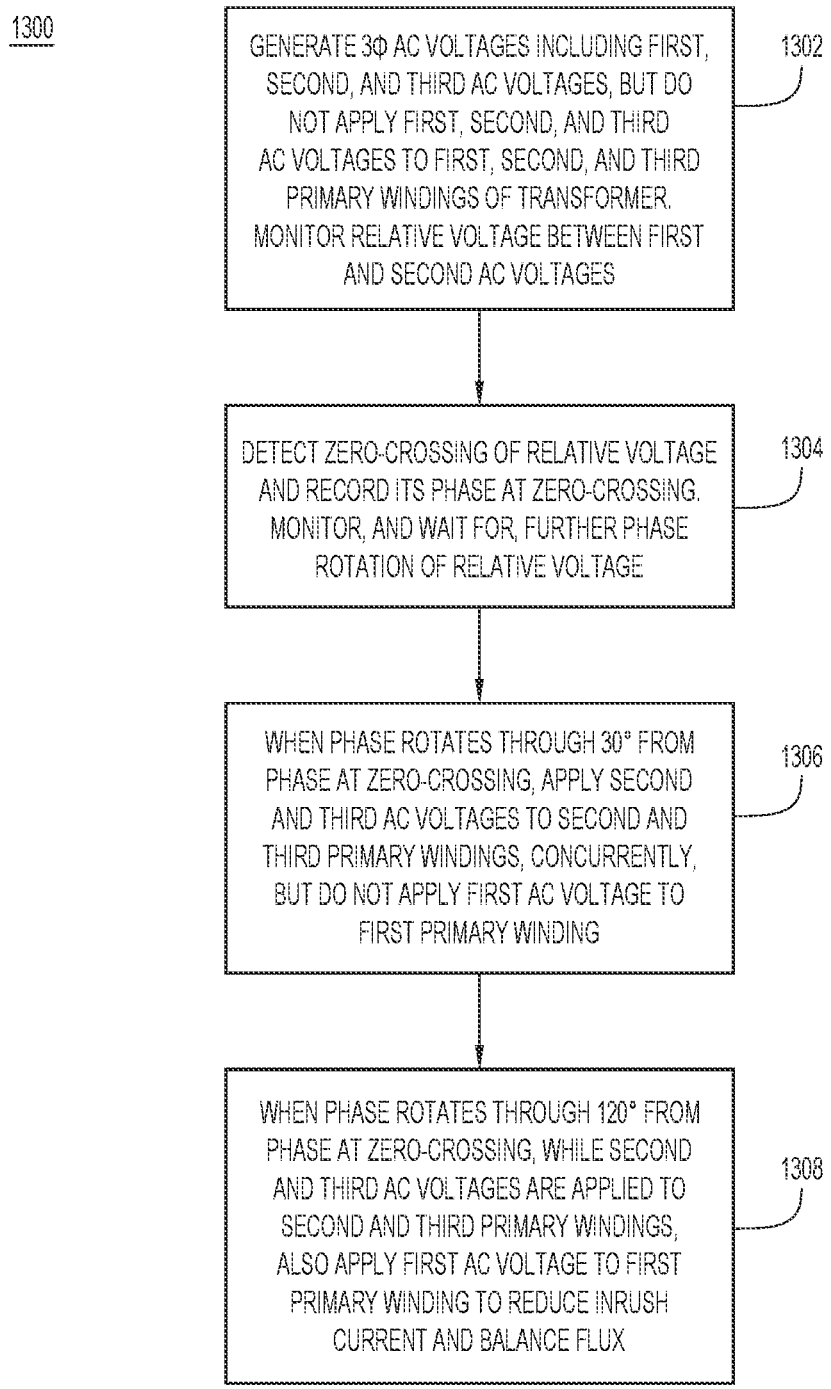
FIG. 13 is a flowchart of an example method of powering-on the transformer and load by applying source 3Φ voltages to the transformer and load in an optimal sequence that balances flux across limbs of the transformer and load.

FIG. 13 is a flowchart of an example method 1300 of powering-on transformer and load 104 from a cold start by applying voltages A, B, and C to transformer-load sections 620A, 620B, and 620C in an optimal sequence that balances flux across limbs LA, LB, and LC. Power-on sequencer 102 performs method 1300 in connection with transformer and load 104. FIG. 13 is described with continued reference to FIGS. 6, 7, 9, and 10.

At 1302, power-on sequencer 102 generates 3Φ voltages A, B, and C but does not actually apply any of the voltages to transformer and load 104. Throughout method 1300, power-on sequencer 102 monitors/measures a magnitude and a phase of line-to-line voltage Vab (which represents a relative voltage between voltages A and B).

In the embodiment of FIG. 6, 3Φ power source 602 generates voltages A, B, and C and applies the same to switches 604A, 604B, and 604C, respectively, but controller 608 turns-off all of the switches, which block voltages A, B, and C from transformer-load sections 620A, 620B, and 620C.

In the embodiment of FIG. 7, controller 708 generates artificial versions of voltages A, B, and C, and voltage Vab, internally, responsive to artificial PWM also generated by the controller. Controller 708 sets (actual) PWM signals 706 to zero, such that 3Φ inverter 702 does not actually generate, and apply to transformer and load 104, any actual 3Φ voltages. Controller 708 monitors the artificial version of voltage Vab. In some embodiments, controller 708 may generate artificial voltages A, B, and C without artificial PWM signals.

At 1304, at an initial time t0, power-on sequencer 102 detects a negative-to-positive zero-crossing (e.g., a first condition) of voltage Vab (e.g., the power-on sequencer detects negative-to-positive zero-crossing 904, as shown in FIG. 9). At the zero-crossing, voltage Vab has an initial phase. Upon detecting the zero-crossing, power-on sequencer 102 starts a waiting period to wait for the phase of voltage Vab to rotate further through/by a predetermined first amount=30° and subsequently by a predetermined second amount=120° from or past the initial phase (i.e., where the second amount is greater than the first amount).

In the embodiment of FIG. 6, controller 608 detects the zero-crossing of voltage Vab, initiates the waiting period, and monitors the phase of voltage Vab.

In the embodiment of FIG. 7, controller 708 detects the zero-crossing of the artificial version of voltage Vab, initiates the waiting period, and monitors the phase of the artificial version of relative voltage Vab.

At 1306, when the phase of voltage Vab has rotated through an additional 30° from the initial phase, at a time t1>t0, power-on sequencer 102 turns-on voltages B, C and applies the same to transformer-load sections 620B, 620C, concurrently, while the power-on sequencer does not turn-on/apply voltage A to transformer-load section 620A. Thus, from the perspective of transformer and load 104, voltages B and C are turned-on and applied, while voltage A is turned off and not applied.

In the embodiment of FIG. 6, when controller 608 determines that voltage Vab has rotated through the additional 30° from the initial phase, the controller turns-on switches 604B and 604C, concurrently, to apply voltages B and C to transformer-load sections 620B and 620C, concurrently. At the same time, controller 608 keeps or maintains switch 604A turned off.

In the embodiment of FIG. 7, when controller 708 determines that the artificial version of voltage Vab has rotated through the additional 30° from the initial phase, the controller applies (actual) PWM signals (PB, $\overline{PB}$), (PC, $\overline{PC}$) to inverter legs 720B, 720C, which in turn generate (actual) voltages B, C and apply the same to transformer-load sections 620B, 620C, concurrently. At the same time, controller 708 does not apply PWM signals (PA, $\overline{PA}$) to inverter leg 720A, which remains turned-off, and does not apply voltage A to transformer-load section 620A.

At 1308, at a time t2>t1<t0, when the phase of voltage Vab has rotated through an additional 120° from the initial phase (or, correspondingly, 90° after voltages B and C are applied to transformer and load 104), while voltages B and C are still applied to the transformer and load, power-on sequencer 102 also applies voltage A to transformer-load section 620A. Thus, from the perspective of transformer and load 104, voltages A, B, and C are all turned-on, and remain turned-on. The power-on sequence is complete.

In the embodiment of FIG. 6, when controller 608 determines that the artificial version of voltage Vab has rotated through the additional 120° from the initial phase, controller 608 turns-on switch 604A (in addition to already turned-on switches 604B, 604C) to apply voltage A (in addition to already applied voltages B, C) to transformer-load section 620A.

In the example of FIG. 7, when controller 708 determines that the artificial version of voltage Vab has rotated through the additional 120° from the initial phase, the controller applies (actual) PWM signals (PA, $\overline{PA}$) to inverter leg 720A, which in turn generates actual voltage A, and applies the same to transformer-load sections 620A. At this time, 3Φ inverter 702 applies (actual) voltages A, B, and C to transformer and load 104.

Thus, in operations 1306 and 1308, power-on sequencer 102, based on results of monitoring a relative voltage (e.g., actual or artificial Vab), implements a power-on/turn-on sequence that includes sequentially applying various one of AC voltages (e.g., voltages A, B, and C) to corresponding ones of primary windings (e.g., primary-side windings Np_AB, Np_BC, and Np_CA), until all of the AC voltages are applied to all of the primary windings in a manner that balances flux across the limbs (e.g., limbs LA, LB, and LC) during and after the turn-on sequence.

Figure 14:
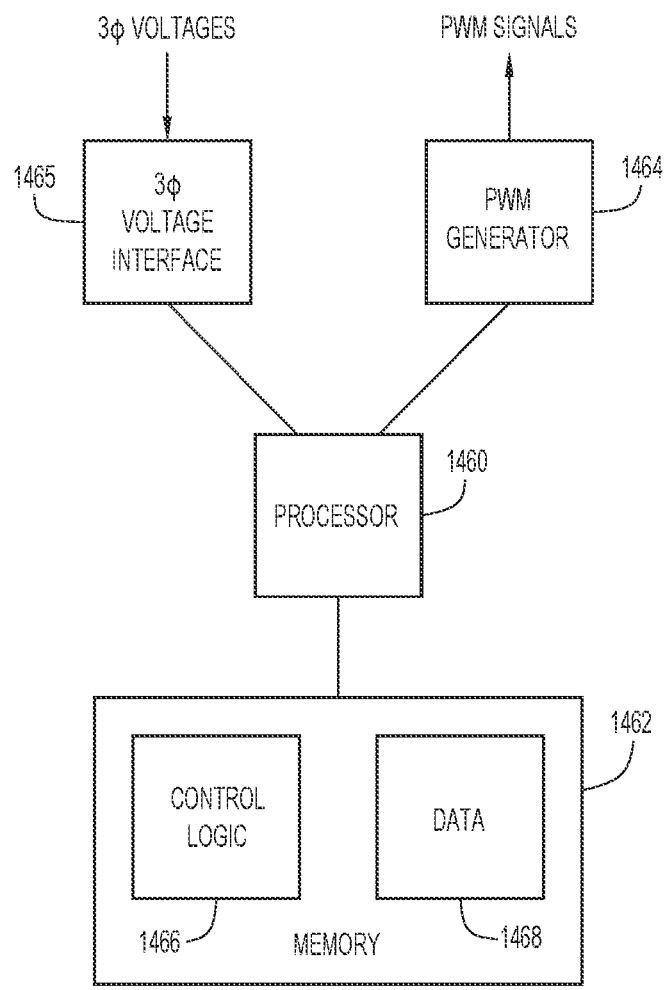
FIG. 14 is a block diagram of controller in a power system according to an embodiment.

FIG. 14 is a block diagram of controller 1400 according to an embodiment. Controller 1400 may be used as controller 608 and 708. Controller 1400 includes processor(s) 1460, a memory 1462, a PWM generator 1464 to generate PWM signals, and a 3Φ voltage interface 1465 to receive 3Φ voltages from a power source communicatively coupled to one another. The aforementioned components may be implemented in hardware, software, or a combination thereof. Memory 1462 stores control software 1466 (referred as "control logic"), that when executed by the processor(s) 1460, causes the processor(s), and more generally, controller 1400, to perform the various operations described herein. The processor(s) 1460 may be a microprocessor or microcontroller (or multiple instances of such components). The memory 1462 may include read only memory (ROM), random access memory (RAM), magnetic disk storage media devices, optical storage media devices, flash memory devices, electrical, optical, or other physically tangible (i.e., non-transitory) memory storage devices. Controller 1400 may also be discrete logic embedded within an integrated circuit (IC) device.

Thus, in general, the memory 1462 may comprise one or more tangible (non-transitory) computer readable storage media (e.g., memory device(s)) encoded with software or firmware that comprises computer executable instructions. For example, control software 1466 includes logic to implement operations performed by the controller 1400. Thus, control software 1466 implements the various methods/operations described herein.

In addition, memory 1462 stores data 1468 used and produced by control software 1466.

In some aspects, the techniques described herein relate to a method of applying three-phase power to a transformer having limbs including a first limb, a second limb, and a third limb respectively wound with primary windings that include a first winding, a second winding, and a third winding, including: generating alternating current (AC) voltages (AC voltages) including a first AC voltage, a second AC voltage, and a third AC voltage; initially not applying the AC voltages to the primary windings; monitoring a relative voltage between the first AC voltage and the second AC voltage; and based on results of monitoring, implementing a power-on sequence of sequentially applying various ones of the AC voltages to corresponding ones of the primary windings until all of the AC voltages are applied to all of the primary windings in a manner that balances flux across the limbs during and after the power-on sequence.

In some aspects, the techniques described herein relate to a method, wherein the limbs of the transformer are connected to each other in a delta configuration.

In some aspects, the techniques described herein relate to a method, wherein implementing the power-on sequence includes: upon detecting a first condition of the relative voltage, waiting for a phase of the relative voltage to rotate further by a first amount; and when the phase of the relative voltage has rotated further by the first amount, respectively applying the second AC voltage and the third AC voltage to the second winding and the third winding, while not applying the first AC voltage to the first winding.

In some aspects, the techniques described herein relate to a method, wherein: detecting the first condition includes detecting a zero-crossing of the relative voltage.

In some aspects, the techniques described herein relate to a method, wherein: the AC voltages are separated in phase by 120°; and waiting includes waiting for the phase to rotate further by 30° from the zero-crossing.

In some aspects, the techniques described herein relate to a method, wherein: detecting the zero-crossing includes detecting the zero-crossing as a negative-to-positive zero-crossing.

In some aspects, the techniques described herein relate to a method, wherein implementing the power-on sequence further includes: upon detecting the first condition of the relative voltage, waiting for the phase of the relative voltage to rotate further by a second amount that is greater than the first amount; and when the phase has rotated further by the second amount, additionally applying the first AC voltage to the first winding.

In some aspects, the techniques described herein relate to a method, wherein: the AC voltages are separated in phase by 120°; and waiting for the phase to rotate further by the second amount includes waiting for the phase to rotate further by 120° from the zero-crossing.

In some aspects, the techniques described herein relate to a method, wherein: generating includes generating artificial versions of the AC voltages that model the AC voltages; and monitoring includes monitoring an artificial version of the relative voltage that models the relative voltage.

In some aspects, the techniques described herein relate to a method, wherein implementing the power-on sequence includes: detecting a zero-crossing of the relative voltage when a phase of the relative voltage has an initial phase; and when the phase of the relative voltage rotates 30° past the initial phase, concurrently applying the second AC voltage and the third AC voltage respectively to the second winding and the third winding, while not applying the first AC voltage to the first winding.

In some aspects, the techniques described herein relate to a method, wherein implementing the power-on sequence further includes: when the phase of the relative voltage rotates 120° past the initial phase, additionally applying the first AC voltage to the first winding.

In some aspects, the techniques described herein relate to an apparatus including: a transformer having limbs including a first limb, a second limb, and a third limb respectively wound with primary windings that include a first winding, a second winding, and a third winding; and a power-on sequencer coupled to the transformer and configured to perform: receiving three phase alternating current (AC) voltages (AC voltages) including a first AC voltage, a second AC voltage, and a third AC voltage; monitoring a relative voltage between the first AC voltage and the second AC voltage; initially not applying the AC voltages to the primary windings; and based on results of monitoring, implementing a power-on sequence of sequentially applying various ones of the AC voltages to corresponding ones of the primary windings until all of the AC voltages are applied to all of the primary windings to balance magnetic flux across the limbs during and after the power-on sequence.

In some aspects, the techniques described herein relate to an apparatus, wherein that limbs of the transformer are connected to each other in a delta configuration.

In some aspects, the techniques described herein relate to an apparatus, wherein the power-on sequencer is configured to perform implementing the power-on sequence by: upon detecting a first condition of the relative voltage, waiting for a phase of the relative voltage to rotate further by a first amount; and when the phase of the relative voltage has rotated further by the first amount, respectively applying the second AC voltage and the third AC voltage to the second winding and the third winding, while not applying the first AC voltage to the first winding.

In some aspects, the techniques described herein relate to an apparatus, wherein: the power-on sequencer is configured to perform detecting the first condition by detecting a zero-crossing of the relative voltage.

In some aspects, the techniques described herein relate to an apparatus, wherein: the AC voltages are separated in phase by 120°; and the power-on sequencer is configured to perform waiting by waiting for the phase to rotate further by 30° from the zero-crossing.

In some aspects, the techniques described herein relate to an apparatus, wherein: the power-on sequencer is configured to perform detecting the zero-crossing by detecting the zero-crossing as a negative-to-positive zero-crossing.

In some aspects, the techniques described herein relate to an apparatus, wherein the power-on sequencer is configured to perform implementing the power-on sequence by further performing: upon detecting the first condition of the relative voltage, waiting for the phase of the relative voltage to rotate further by a second amount that is greater than the first amount; and when the phase has rotated further by the second amount, additionally applying the first AC voltage to the first winding.

In some aspects, the techniques described herein relate to an apparatus, wherein: the AC voltages are separated in phase by 120°; and the power-on sequencer is configured to perform waiting for the phase to rotate further by the second amount by waiting for the phase to rotate further by 120° from the zero-crossing.

In some aspects, the techniques described herein relate to an apparatus, wherein: the power-on sequencer is configured to perform generating by generating artificial versions of the AC voltages that model the AC voltages; and the power-on sequencer is configured to perform monitoring by monitoring an artificial version of the relative voltage that models the relative voltage.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of applying three-phase power to a transformer having limbs including a first limb, a second limb, and a third limb respectively wound with primary windings that include a first winding, a second winding, and a third winding, comprising:
generating alternating current (AC) voltages (AC voltages) including a first AC voltage, a second AC voltage, and a third AC voltage;
initially not applying the AC voltages to the primary windings;

monitoring a relative voltage between the first AC voltage and the second AC voltage; and based on results of monitoring, implementing a power-on sequence of sequentially applying various ones of the AC voltages to corresponding ones of the primary windings until all of the AC voltages are applied to all of the primary windings in a manner that balances flux across the limbs.

2. The method of claim 1, wherein the limbs of the transformer are connected to each other in a delta configuration.

3. The method of claim 1, wherein implementing the power-on sequence includes:

upon detecting a first condition of the relative voltage, waiting for a phase of the relative voltage to rotate further by a first amount; and when the phase of the relative voltage has rotated further by the first amount, respectively applying the second AC voltage and the third AC voltage to the second winding and the third winding, while not applying the first AC voltage to the first winding.

4. The method of claim 3, wherein:

detecting the first condition includes detecting a zero-crossing of the relative voltage.

5. The method of claim 4, wherein:

the AC voltages are separated in phase by 120°; and waiting includes waiting for the phase to rotate further by 30° from the zero-crossing.

6. The method of claim 4, wherein:

detecting the zero-crossing includes detecting the zero-crossing as a negative-to-positive zero-crossing.

7. The method of claim 4, wherein implementing the power-on sequence further includes:

upon detecting the first condition of the relative voltage, waiting for the phase of the relative voltage to rotate further by a second amount that is greater than the first amount; and when the phase has rotated further by the second amount, additionally applying the first AC voltage to the first winding.

8. The method of claim 7, wherein:

the AC voltages are separated in phase by 120°; and waiting for the phase to rotate further by the second amount includes waiting for the phase to rotate further by 120° from the zero-crossing.

9. The method of claim 1, wherein:

generating includes generating artificial versions of the AC voltages that model the AC voltages; and monitoring includes monitoring an artificial version of the relative voltage that models the relative voltage.

10. The method of claim 1, wherein implementing the power-on sequence includes:

detecting a zero-crossing of the relative voltage when a phase of the relative voltage has an initial phase; and when the phase of the relative voltage rotates 30° past the initial phase, concurrently applying the second AC voltage and the third AC voltage respectively to the second winding and the third winding, while not applying the first AC voltage to the first winding.

11. The method of claim 10, wherein implementing the power-on sequence further includes:

when the phase of the relative voltage rotates 120° past the initial phase, additionally applying the first AC voltage to the first winding.

12. An apparatus comprising:

a transformer having limbs including a first limb, a second limb, and a third limb respectively wound with primary windings that include a first winding, a second winding, and a third winding; and a power-on sequencer coupled to the transformer and configured to perform:

receiving three phase alternating current (AC) voltages (AC voltages) including a first AC voltage, a second AC voltage, and a third AC voltage;

monitoring a relative voltage between the first AC voltage and the second AC voltage;

initially not applying the AC voltages to the primary windings; and based on results of monitoring, implementing a power-on sequence of sequentially applying various ones of the AC voltages to corresponding ones of the primary windings until all of the AC voltages are applied to all of the primary windings to balance magnetic flux across the limbs.

13. The apparatus of claim 12, wherein that limbs of the transformer are connected to each other in a delta configuration.

14. The apparatus of claim 12, wherein the power-on sequencer is configured to perform implementing the power-on sequence by:

upon detecting a first condition of the relative voltage, waiting for a phase of the relative voltage to rotate further by a first amount; and when the phase of the relative voltage has rotated further by the first amount, respectively applying the second AC voltage and the third AC voltage to the second winding and the third winding, while not applying the first AC voltage to the first winding.

15. The apparatus of claim 14, wherein:

the power-on sequencer is configured to perform detecting the first condition by detecting a zero-crossing of the relative voltage.

16. The apparatus of claim 15, wherein:

the AC voltages are separated in phase by 120°; and the power-on sequencer is configured to perform waiting by waiting for the phase to rotate further by 30° from the zero-crossing.

17. The apparatus of claim 15, wherein:

the power-on sequencer is configured to perform detecting the zero-crossing by detecting the zero-crossing as a negative-to-positive zero-crossing.

18. The apparatus of claim 15, wherein the power-on sequencer is configured to perform implementing the power-on sequence by further performing:

upon detecting the first condition of the relative voltage, waiting for the phase of the relative voltage to rotate further by a second amount that is greater than the first amount; and when the phase has rotated further by the second amount, additionally applying the first AC voltage to the first winding.

19. The apparatus of claim 18, wherein:

the AC voltages are separated in phase by 120°; and the power-on sequencer is configured to perform waiting for the phase to rotate further by the second amount by waiting for the phase to rotate further by 120° from the zero-crossing.

20. The apparatus of claim 12, wherein:

the power-on sequencer is configured to perform generating by generating artificial versions of the AC voltages that model the AC voltages; and the power-on sequencer is configured to perform monitoring by monitoring an artificial version of the relative voltage that models the relative voltage.

\* \* \* \* \*